United States Patent [19]
Keen

[11] Patent Number: 5,402,813
[45] Date of Patent: Apr. 4, 1995

[54] IN-LINE CHLORINATOR FOR CONDENSATION LINE

[76] Inventor: Wendell J. Keen, P.O. Box 954, Denham Springs, La. 70727

[21] Appl. No.: 140,421

[22] Filed: Oct. 25, 1993

[51] Int. Cl.⁶ .......................................... B01D 11/02
[52] U.S. Cl. .................................... 137/15; 137/268; 422/264
[58] Field of Search ............... 137/268, 1, 15; 422/261, 264; 239/310

[56] References Cited

U.S. PATENT DOCUMENTS

| | | | |
|---|---|---|---|
| 1,598,888 | 9/1926 | Stein | 137/268 X |
| 3,191,915 | 6/1965 | Goettl | 137/268 X |
| 4,692,314 | 9/1987 | Etani | 137/268 X |
| 5,286,377 | 2/1994 | Galvan | 422/264 X |

Primary Examiner—Stephen M. Hepperle
Assistant Examiner—Kevin L. Lee
Attorney, Agent, or Firm—Reginald F. Roberts, Jr.

[57] ABSTRACT

An in-line algicide dispenser for disposal upstream of a condensation line or cold-water drain line which provides an outlet for condensate from an air-conditioning unit, an ice-maker, or other device utilizing a condensation or drain line. A water-leachable algicide placed in the dispenser provides protection from clogging or plugging of the condensation or drain line by growth of cold-water algae.

5 Claims, 3 Drawing Sheets

IN-LINE CHLORINATOR FOR CONDENSATION LINE

BACKGROUND OF THE INVENTION

This invention relates to condensation lines or cold-water drain lines. More particularly, it relates to the prevention of the clogging or plugging of such lines by growth of cold-water algae.

At present, clogged or plugged drain lines are serviced by being blown out with FREON TM under pressure; or by being mechanically reamed out, followed by flushing with water. These methods are both costly and time-consuming. Moreover, the first method is environmentally and ecologically unsound and detrimental, since it introduces a chlorofluorocarbon into the atmosphere. Additionally, air-conditioner condensation lines are notorious for overflowing and thereby damaging or destroying ceilings. What is needed, therefore, is an efficient, reliable, and an economical way of preventing the algae from growing. The present invention provides a solution to this problem.

SUMMARY OF THE INVENTION

In general, the present invention in a first aspect provides an in-line algicide dispenser for a condensation line or cold-water drain line. The in-line algicide dispenser comprises a first passageway, a second passageway, and a receptacle for a water-leachable algicide; i.e., a substance which kills, destroys, or prevents the growth of algae.

The first passageway has first and second open ends. The second passageway has an open first end and a closed second end. The first and second passageways communicate with one another between their first and second ends.

The receptacle for the algicide is disposed at the second end of the second passageway.

Means are provided for closing the first end of the second passageway, and for connectably disposing the first passageway between and in series with an air-conditioning unit or ice-maker and a condensation or cold-water drain line for the air-conditioning unit or ice-maker, respectively.

In a second aspect, the invention provides a method for the prevention of algae growth in a condensation line or cold-water drain line through which a stream of water is flowing. The method comprises disposing a water-leachable algicide in the stream of water upstream of the line.

DETAILED DESCRIPTION OF THE INVENTION

Figure 1:
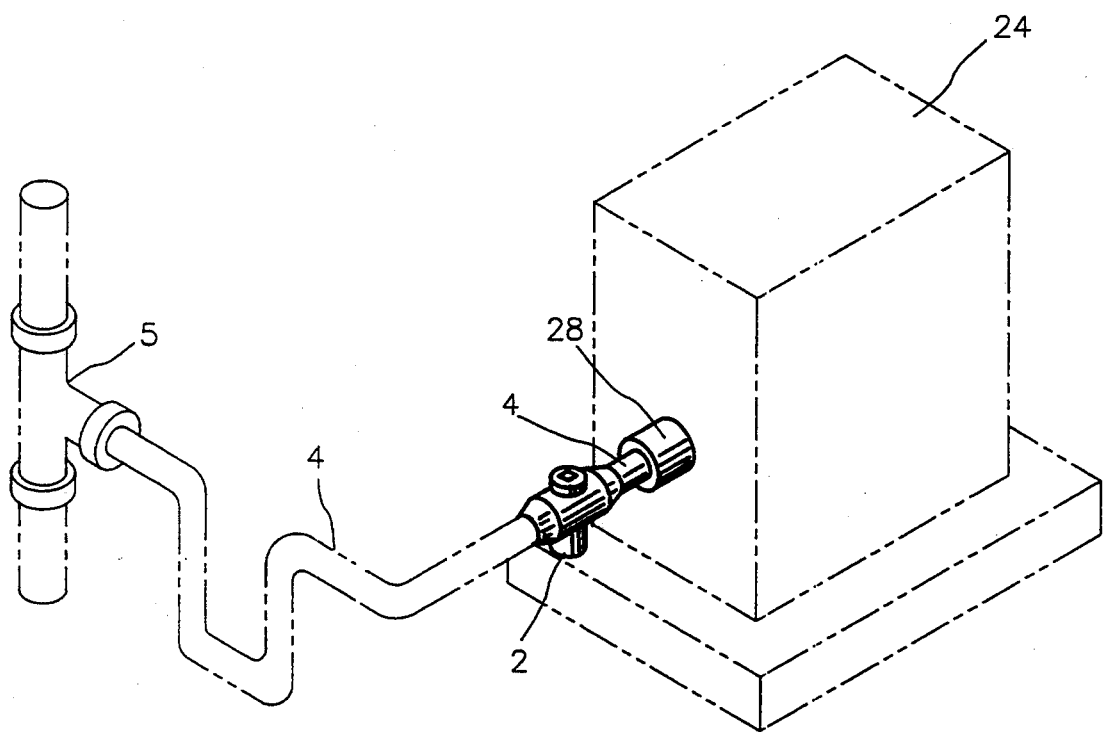
FIG. 1 is an isometric view of an in-line algicide dispenser, made in accordance with the principles of the present invention, inserted in a condensation or cold-water drain line.
Figure 2:
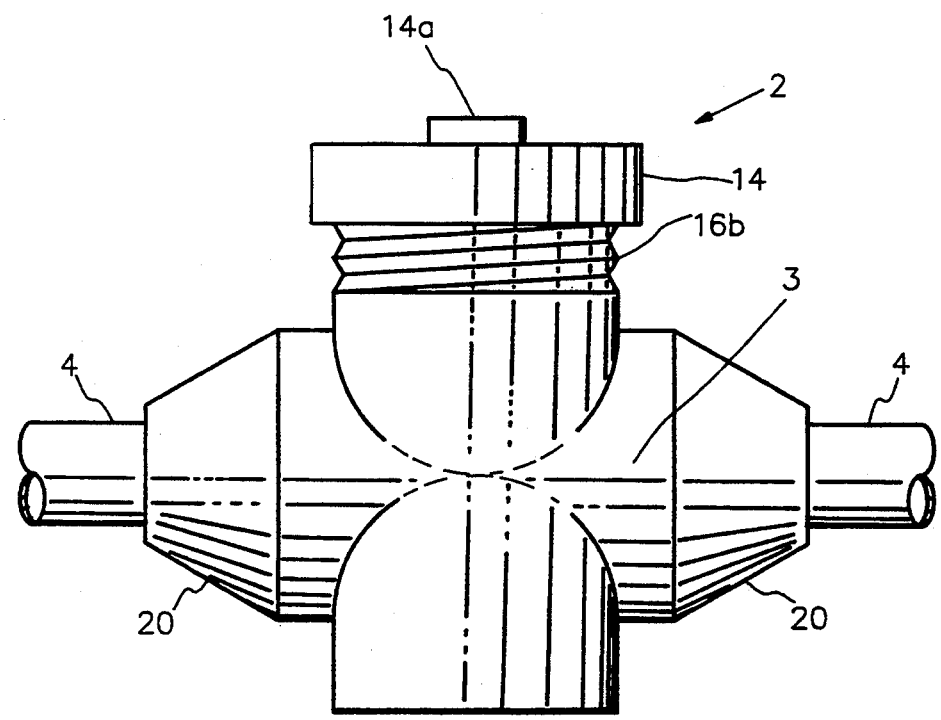
FIG. 2 is a frontal view of a first embodiment of the in-line algicide dispenser shown in FIG. 1.
Figure 3:
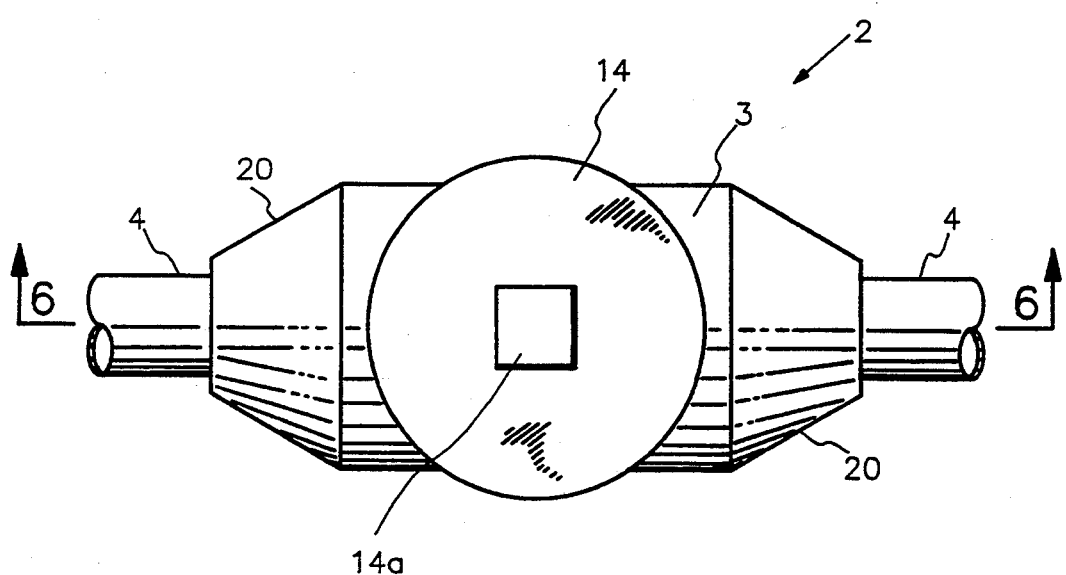
FIG. 3 is a top plan view of the in-line algicide dispenser shown in FIG. 2.
Figure 4:
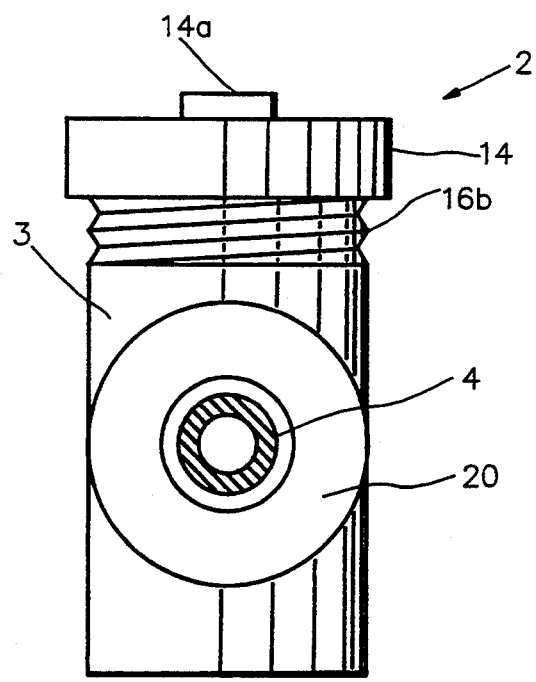
FIG. 4 is an end view of the in-line algicide dispenser shown in FIG. 2.

More specifically, reference is made to FIG. 1, in which is shown an in-line algicide dispenser, made in accordance with the principles of the present invention, and generally designated by the numeral 2, inserted in a condensation or cold-water drain line 4 from an air-conditioning unit, ice-maker, or the like, generally designated by the numeral 24.

Reference is now made to FIGS. 2, 3, 4, and 6, in which is shown a first embodiment of an in-line algicide dispenser made in accordance with the principles of the present invention, and generally designated by the numeral 2. The in-line algicide dispenser 2 comprises a first passageways 6, a second passageway 8, and a receptacle 10 for a water-leachable algicide 12.

The first passageway 6 has first and second open ends 6a and 6b, respectively. The second passageway 8 has an open first end 8a and a closed second end 8b. The first and second passageways 6 and 8 communicate with one another between their first and second ends 6a, 6b, 8a, 8b.

The receptacle 10 for the water-leachable algicide 12 is disposed at the second end 8b of the second passageway 8.

After the water-leachable algicide 12 has been deposited in the receptacle 10, the first end 8a of the second passageway 8 is closed with a cap 14 having a handle 14a. Preferably, the cap 14 and the body 3 at the first end 8a of the second passageway 8 are provided with matching threads 18b and 16b, respectively, which are constructed and arranged to engage one another and thereby seal the first end 8a of the second passageway 8 with the cap 14. Internal threads 18b on the internal surface of the cap 14 engage external threads 16b on the external surface of the body 3 at the first end 8a of the second passageway 8.

The first and second ends 6a, 6b of the first passageway 6 are beneficially provided with bushings 20 which connect with segments of the condensation or drain line 4. Preferably, these connections are sealed with glue or the like.

The water-leachable algicide 12 preferably includes an ingredient which gradually releases chlorine to a flowing stream of water 22. A tablet containing one such ingredient is marketed as PACE ®, a registered trademark of Olin Corporation, Water Products & Services Division, 120 Long Ridge Road, Stanford, Conn. 06904. The active ingredient in the PACE ® tablet is trichloro-S-triazinetrione. The tablet contains ninety-nine percent of this ingredient and one percent inert ingredients. The available chlorine is eighty-nine percent. A second such tablet is marketed as 2,000 FLUSHES ®, a registered trademark of Block Drug Company, Jersey City, N. J. The tablet contains an organic chlorine compound.

The active ingredient or ingredients in PACE ® and 2,000 FLUSHES ® is/are an organic chlorine compound or organic chlorine compounds. A second type of ingredient which functions in the same manner is an inorganic chlorine compound such as $Ca(OCl)Cl$, variously referred to as bleaching powder, chloride of lime, chlorinated lime, and calcium oxychloride.

The in-line algicide dispenser 2 is inserted in the condensation line or drain 4 as close to the air-conditioner, ice-maker, or other appliance 24 as possible. Stated in slightly different terms, the water-leachable algicide 12 is disposed in the flowing stream of condensate as far upstream as possible. The dispenser 2 will then provide continuous protection against downstream clogging or plugging of the condensation or drain line 4 by algae for as long as the algicide 12 takes to dissolve in the flowing stream of condensate 22.

One feasible arrangement for so doing is shown in FIGS. 1, 2, 3, and 6. The algicide dispenser 2 is inserted in the condensation or drain line 4 by cutting said line as close to the unit 24 as feasible.

Figure 7:
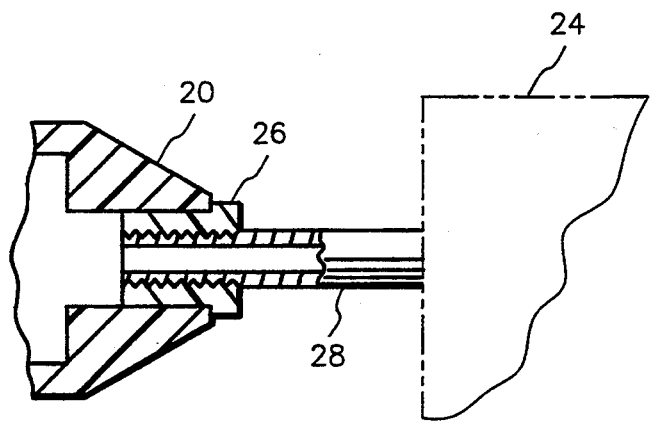
FIG. 7 is a cross-sectional view showing the connection of an in-line algicide dispenser to an air-conditioning unit or ice-maker.

A second and preferred arrangement is shown in FIG. 7. Here the in-line algicide dispenser is connected directly to the appliance 24, using a bushing 26 and an appliance drain 28.

Figure 5:
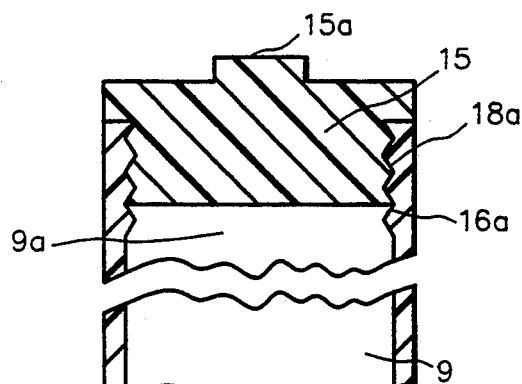
FIG. 5 is a cross-sectional view of part of a second embodiment of an in-line algicide dispenser made in accordance with the principles of the present invention.
Figure 6:
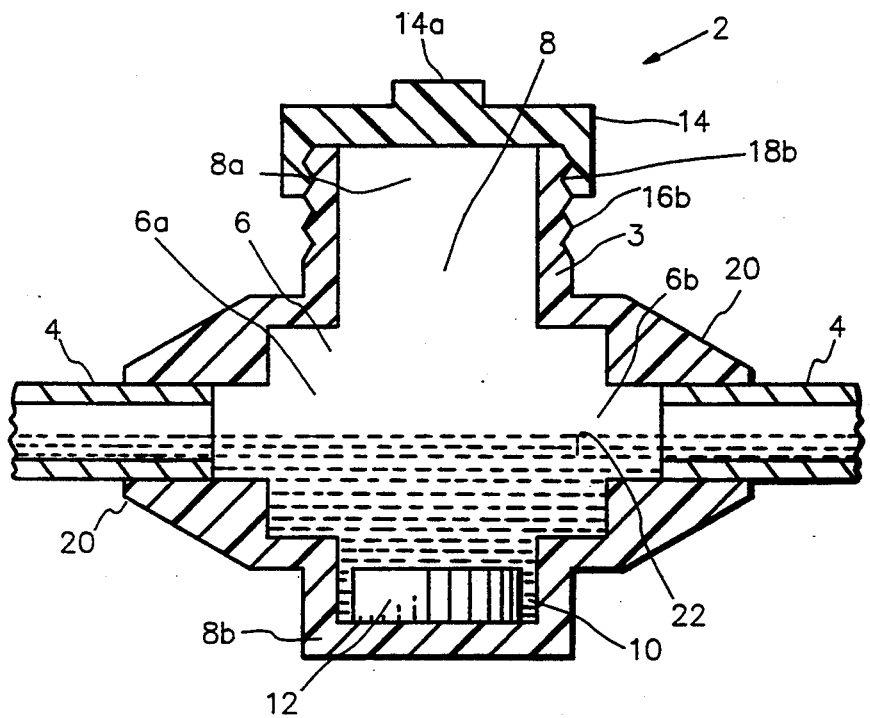
FIG. 6 is a cross-sectional view of the in-line algicide dispenser shown in FIG. 3, taken along the cutting line 6—6.

Reference is now made to FIG. 5, in which is shown part of a second embodiment of an in-line algicide dispenser made in accordance with the principles of the present invention. The second embodiment of the dispenser differs from the first embodiment 2 only in the structure of a body near the first end 9a of a second passageway 9, and the structure of a plug 15 having a handle 15a, which are comparable to the body 3 near the first end 8a of the second passageway 8, and to the cap 14 having the handle 14a of the first embodiment 2 shown in FIGS. 2, 3, 4, and 6. In the second embodiment of the in-line algicide dispenser, the first end 9a of the second passageway 9 is closed by having internal threads 16a on the internal surface of the body near the first end 9a of the second passageway 9 mate with and engage external thread 18a on the external surface of the plug 15.

Besides the benefits and advantages already set forth in the foregoing description of the present invention, it will be apparent to those skilled in the art that the construction and arrangement of the invention beneficially provides ready, easy, and convenient access to condensation and cold-water drain-lines 4 for cleaning the lines.

I claim:
1. A method for the prevention of algae growth, the method comprising: disposing a water-leachable algicide in a line draining and exitting a unit having cooling coils which form non-circulating condensed waste water that enters a first end of the line, flows through the line, and exits a second end of the line, the water-leachable algicide being disposed in the line at the first end thereof, whereby the condensed water entering the line leaches the water-leachable algicide, forming an algicide-containing stream of condensed water which flows through the line and exits the second end of the line, thereby preventing the growth of algae in the line.

2. The method of claim 1, wherein the water-leachable algicide is disposed in the line by severing the line near the first end thereof, thereby forming first and second lengths of the line, and connecting the first and second lengths of the line to first and second ends of a flow-through dispenser containing the water-leachable algicide, thereby inserting the algicide dispenser in the line at the first end of the line.

3. The method of claim 1, wherein the water-leachable algicide is disposed in the line by connecting the first end of the line to a first end of a flow-through dispenser containing the water-leachable algicide, and connecting a second end of the algicide dispenser to the unit, thereby inserting the algicide dispenser in the line at the first end of the line.

4. The method of claim 2, wherein the algicide dispenser comprises:
(a) a first passageway having first and second open ends;
(b) a second passageway having an open first end and a closed second end;
the first and second passageways communicating with one another between their first and second ends;
(c) a receptacle for a water-leachable algicide at the second end of the second passageway; and
(d) means for closing the first end of the second passageway.

5. The method of claim 3, wherein the algicide dispenser comprises:
(a) a first passageway having first and second open ends;
(b) a second passageway having an open first end and a closed second end;
the first and second passageways communicating with one another between their first and second ends;
(c) a receptacle for a water-leachable algicide at the second end of the second passageway; and
(d) means for closing the first end of the second passageway.

* * * * *